Patented Sept. 8, 1936

2,053,515

UNITED STATES PATENT OFFICE 2,053,515

CELLULOSE ORGANIC ESTER COMPOSITION CONTAINING THE ETHYL ETHER OF ETHYLENE GLYCOL MONO-ISO-CAPROATE

James D. Coleman, Jr., and Henry B. Smith, Rochester, N. Y., assignors to Eastman Kodak Company, Rochester, N. Y., a corporation of New York No Drawing. Application July 6, 1934, Serial No. 734,009

5 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, artificial silk, varnishes, lacquers, and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Other objects will become apparent to those skilled in the art to which this invention pertains.

While cellulose acetate has been known for decades, it has also been known that to utilize it in the various plastic arts it is necessary to mix therewith various plasticizing or conditioning agents, such, for instance, as monochloronaphthalene, ethyl or methyl adipate, methyl hydrogen adipate, or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not compatible or at least not sufficiently compatible with cellulose acetate to be used as plasticizers in cellulose acetate compositions.

We have discovered that valuable properties may be induced in and/or contributed to compositions containing organic esters of cellulose, such as cellulose acetate, by adding thereto as a plasticizing compound the ethyl ether of ethylene glycol mono-iso-caproate. The particularly useful properties which this compound induces in or contributes to cellulosic compositions containing it are hereinafter enumerated.

The ethyl ether of ethylene glycol mono-iso-caproate has the following structural formula

$$C_2H_5.O.CH_2.CH_2.OOC.(CH_2)_2.CH(CH_3)_2$$

and may be prepared as follows. 100 grams of iso-caproic acid, 80 grams of the ethyl ether of ethylene glycol, and 1 cc. of concentrated sulphuric acid are placed in a flask and heated at 98° C. for 4 hours. The reaction mixture is poured into water, and the unreacted ethyl ether of ethylene glycol is washed out with water. The product is then extracted with ether, washed with N/10 sodium hydroxide, and dried over sodium sulfate. The ether is distilled off, and the product distilled in vacuo. The ethyl ether of ethylene glycol mono-iso-caproate boils at 112–115° C. at a pressure of 20–25 mm.

In order that those skilled in this art may better understand our invention we would state, by way of illustration, that for the manufacture of photographic film base or other sheets our new compositions of matter may be compounded as follows: 100 parts of acetone-soluble cellulose acetate, i. e. cellulose acetate containing from about 36% to 42% acetyl radical, approximately, is dissolved with stirring at atmospheric temperature in 300 to 500 parts, preferably 400 parts, by weight, of acetone. To this solution may be added from 10 to 50 parts by weight of the ethyl ether of ethylene glycol mono-iso-caproate. Within the limits stated, the amount of plasticizer may be decreased or increased, depending upon whether it is desired to decrease or increase, respectively, the properties which this plasticizer contributes to the finished product.

The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with our invention are very tough and flexible. For instance, films of cellulose acetate plasticized with from 10% to 30% (10 to 30 parts by weight based on the cellulose acetate) of the ethyl ether of ethylene glycol mono-iso-caproate had an initial flexibility of from 165% to 335% greater than that of film containing no plasticizer. Furthermore, film so plasticized maintains flexibility in a superior fashion. For instance films plasticized with 10% and 30% of the ethyl ether of ethylene glycol mono-iso-caproate maintained flexibility at 65° C. for 310 days, whereas an unplasticized film became brittle in 30 days. This indicates that films or sheets so plasticized will withstand ordinary usage satisfactorily for many years.

Other similar solvents (instead of acetone) which are compatible with the cellulose acetate and our new plasticizer will also occur to those skilled in this art, such as ethylene chloride-alcohol mixtures. In like manner this plasticizer may be compounded with other single organic esters of cellulose, such as cellulose propionate, butyrate, stearate and the like, or with mixed organic esters, such as cellulose aceto-stearate, cellulose aceto-propionate, cellulose aceto-butyrate, cellulose aceto-lactate, cellulose aceto-tartrate or the like, a suitable solvent which will dissolve both the celulosic derivative and the plasticizer being employed, such, for instance, as an alkylene chloride with or without the addition of alcohol.

Inasmuch as our above-described compositions of matter are useful in the production of films and sheets, it will be apparent that our new plasticizer may also be employed with advantage in the other branches of the plastic art. For instance, our novel plasticizer may be employed in connection with a number of the known lacquer and varnish formulae with which it may be found to be compatible. In such cases the plasticizer is usually first put into solution in the cellulose derivative solution, and if non-solvents are added for the purpose of cheapening the composition they are added only to such an extent as will not precipitate the derivative from solution. Other uses within the scope of our invention will also suggest themselves to those skilled in the art and are to be included within the scope of the claims appended hereto. While we have mentioned proportions of 10% to 50% of the plasticizer as being suitable for use in photographic film base, we have found that the ethyl ether of ethylene glycol mono-iso-caproate is compatible with cellulose acetate to the extent of 75% of the weight of the cellulose acetate.

What we claim as our invention and desire to be secured by Letters Patent of the United States is:

1. A composition of matter comprising a cellulose organic acid ester and the ethyl ether of ethylene glycol mono-iso-caproate.

2. A composition of matter comprising cellulose acetate and the ethyl ether of ethylene glycol mono-iso-caproate.

3. A composition of matter comprising 100 parts of cellulose acetate and from 10 to 75 parts, by weight, of the ethyl ether of ethylene glycol mono-iso-caproate.

4. A transparent, flexible sheet comprising 100 parts of a cellulose organic acid ester and, as a plasticizer therefor, about 10 to 60 parts, by weight, of the ethyl ether of ethylene glycol mono-iso-caproate.

5. A transparent, flexible sheet comprising 100 parts of cellulose acetate and, as a plasticizer therefor, about 10 to 60 parts, by weight, of the ethyl ether of ethylene glycol mono-iso-caproate.

JAMES D. COLEMAN, Jr.
HENRY B. SMITH.